US012683081B2

(12) United States Patent (10) Patent No.: US 12,683,081 B2

Iguchi et al. (45) Date of Patent: Jul. 14, 2026

(54) ELECTRONIC COMPONENT STRUCTURE WITH MULTILAYER CONNECTION PORTION

(71) Applicant: TDK CORPORATION, Tokyo (JP)

(72) Inventors: Toshihiro Iguchi, Tokyo (JP); Tomohisa Fukuoka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 183 days.

(21) Appl. No.: 18/603,515

(22) Filed: Mar. 13, 2024

(65) Prior Publication Data

US 2024/0321520 A1 Sep. 26, 2024

(30) Foreign Application Priority Data

Mar. 22, 2023 (JP) ................................. 2023-045453

(51) Int. Cl.
H01G 4/232 (2006.01)
H01G 4/30 (2006.01)

(52) U.S. Cl.
CPC ............. H01G 4/2325 (2013.01); H01G 4/30 (2013.01)

(58) Field of Classification Search
CPC ............ H01G 2/06; H01G 2/065; H01G 4/30; H01G 4/2325; H01G 4/38
See application file for complete search history.

(56) References Cited

U.S. PATENT DOCUMENTS

| 2014/0077376 A1* | 3/2014 | Umbach | ................. H01L 24/83 |
| | | | 438/597 |
| 2017/0232562 A1* | 8/2017 | Maeno | ................. B23K 35/302 |
| | | | 228/262.61 |
| 2018/0297152 A1* | 10/2018 | Noguchi | .................. C22C 9/06 |
| 2019/0355522 A1 | 11/2019 | Kanbe et al. | |

FOREIGN PATENT DOCUMENTS

| CN | 106378583 A | * | 2/2017 | ............. H01L 24/11 |
| JP | 2007019360 A | * | 1/2007 | ............. H01L 24/83 |
| JP | 2018-133355 A | | 8/2018 | |
| JP | 2018149580 A | * | 9/2018 | |
| JP | 2019135734 A | * | 8/2019 | |

* cited by examiner

*Primary Examiner* — David M Sinclair
(74) *Attorney, Agent, or Firm* — Oliff PLC

(57) ABSTRACT

An electronic component structure includes: a first electronic component; a second electronic component; a low melting point layer located between the first electronic component and the second electronic component and containing a first metal material having a melting point of 300° C. or lower; and a high melting point layer located between the first electronic component and the second electronic component and containing a second metal material having a melting point of 400° C. or higher. In the electronic component structure, the first electronic component and the second electronic component are connected to each other by a multilayer connection portion formed by overlapping the low melting point layer and the high melting point layer.

16 Claims, 3 Drawing Sheets

ELECTRONIC COMPONENT STRUCTURE WITH MULTILAYER CONNECTION PORTION

BACKGROUND OF THE INVENTION

Field of the Invention

The present invention relates to an electronic component structure formed by connecting a plurality of electronic components or by connecting an electronic component and a metal plate.

Description of the Related Art

In recent years, in order to satisfy requirements such as stress relaxation during mounting and high mounting density, an electronic component structure has been proposed in which a plurality of chip components are connected and integrated or a chip component and a metal plate member are connected and integrated with each other. In such an electronic component structure, it is necessary to prevent a problem that a connection portion connecting constituent portions included in the structure melts and the constituent portions are separated at the time of reflow heating or the like when surface mounting or the like is performed.

For example, in an electronic component structure in the related art, it has been proposed to use an intermetallic compound containing Cu for a bonding portion.

[Patent Document 1] JP Patent Application Laid Open No. 2018-133355

SUMMARY OF THE INVENTION

However, the intermetallic compound proposed as a connection material in the related art has a melting point higher than that of a metal having a low melting point, but tends to be brittle compared to a single metal or the like. Accordingly, it has been found that, in the electronic component structure in the related art in which constituent portions are bonded to each other by such an intermetallic compound, under a use condition in which a large stress or the like acts, there is a risk that embrittlement of a connection portion progresses and connection strength thereof is reduced.

The present disclosure has been made in view of such a situation, and provides an electronic component structure capable of preventing embrittlement of a connection portion due to stress.

In order to achieve the above-mentioned object, an electronic component structure according to a first aspect of the present disclosure is provided including:

a first electronic component;

a second electronic component;

a low melting point layer located between the first electronic component and the second electronic component and containing a first metal material having a melting point of 300° C. or lower; and a high melting point layer located between the first electronic component and the second electronic component and containing a second metal material having a melting point of 400° C. or higher, in which the first electronic component and the second electronic component are connected to each other by a multilayer connection portion formed by overlapping the low melting point layer and the high melting point layer.

In addition, an electronic component structure according to a second aspect of the present disclosure is provided including:

a first electronic component;

a metal plate;

a low melting point layer located between the first electronic component and the metal plate and containing a first metal material having a melting point of 300° C. or lower; and a high melting point layer located between the first electronic component and the metal plate and containing a second metal material having a melting point of 400° C. or higher, in which the first electronic component and the metal plate are connected to each other by a multilayer connection portion formed by overlapping the low melting point layer and the high melting point layer.

In the electronic component structure according to the present disclosure, a plurality of electronic components or the electronic components and the metal plate are connected to each other by the multilayer connection portion formed by overlapping the low melting point layer and the high melting point layer. Such a multilayer connection portion can withstand heat at the time of reflow to maintain connection of the electronic components and the like, and can prevent a problem that a small crack is generated in the multilayer connection portion due to stress and embrittlement of the multilayer connection portion progresses.

For example, the second metal material may comprise an intermetallic compound, and the intermetallic compound may be any one of $Cu_6Sn_5$, $Cu_3Sn$, $Ni_3Sn_4$, $(Cu,Ni)_6Sn_5$, and $Ag_3Sn$.

Since the high melting point layer containing the second metal material, which comprises such an intermetallic compound, is stacked, an appropriate high melting point for allowing the multilayer connection portion to withstand the heat at the time of reflow, appropriate electrical conductivity, and suitable bondability with the low melting point layer, the electronic components, and the metal plate are achieved.

For example, the first metal material may comprise Sn alone or a solid solution containing Sn as a main component.

Since the low melting point layer containing the first metal material, which comprises Sn alone or a solid solution, is stacked, it is possible to suitably prevent the problem that embrittlement of the multilayer connection portion due to stress or the like progresses.

For example, the multilayer connection portion may have a stacked structure of three or more layers with one high melting point layer sandwiched between two low melting point layers.

By having a multilayer stacked structure in which the high melting point layer is sandwiched between two low melting point layers, such a multilayer connection portion can suitably withstand the heat at the time of reflow, and can suitably prevent progress of the embrittlement due to stress.

For example, one of the two low melting point layers may have a thickness larger than that of the other.

By making thicknesses of the low melting point layers asymmetric between one side and the other side of the high melting point layer, it is possible to more suitably prevent an occurrence of minute cracks or the like due to stress.

For example, the high melting point layer may comprise a center portion disposed in a center in a first direction perpendicular to a stacking direction of the multilayer connection portion, and peripheral portions disposed on both sides of the center portion so as to sandwich the center portion along the first direction and having a thickness larger than that of the center portion, and the low melting point layers may be continuously in contact with the high melting point layer from one of the peripheral portions sandwiching the center portion to the other of the peripheral portions via the center portion.

A multilayer connection portion in which such low melting point layers and high melting point layer are stacked can suitably withstand the heat at the time of reflow, and can prevent the problem that the multilayer connection portion becomes brittle due to stress.

For example, the first metal material may comprise Sn alone or a solid solution containing Sn as a main component, and the high melting point layer may contain the first metal material at a content ratio smaller than that of the low melting point layer.

In addition, the high melting point layer may contain the second metal material which is an intermetallic compound, the first metal material, and a third metal material composed of Cu alone or a solid solution containing Cu as a main component.

The second metal material may be composed of an intermetallic compound containing Sn.

In addition, the second metal material may be composed of an intermetallic compound containing Cu and Sn.

A multilayer connection portion in which such low melting point layers and high melting point layer are stacked can suitably withstand the heat at the time of reflow, and bonding between the low melting point layers and the high melting point layer is strong and the connection strength can be suitably maintained.

For example, a content ratio of the first metal material and the second metal material in the high melting point layer may be a value of 0.4 to 0.8 obtained by dividing the first metal material by the second metal material.

In addition, for example, a content ratio of the second metal material and the third metal material in the high melting point layer may be a value of 0.3 to 1.0 obtained by dividing the third metal material by the second metal material.

The content ratios of respective metal materials in the high melting point layer are not particularly limited, and by setting the content ratios within a predetermined range, heat resistance of the multilayer connection portion can be improved, and an effect of preventing embrittlement can be improved.

For example, an average thickness of the low melting point layer may be 10 μm to 60 μm.

In addition, for example, an average thickness of the high melting point layer may be 30 μm to 100 μm.

Thicknesses of the low melting point layer and the high melting point layer in the multilayer connection portion are not particularly limited, and by setting the thicknesses of the low melting point layer and the high melting point layer within a predetermined range, the heat resistance of the multilayer connection portion can be improved, and the effect of preventing the embrittlement can be improved.

DETAILED DESCRIPTION OF THE PREFERRED EMBODIMENTS

First Embodiment

Figure 1:
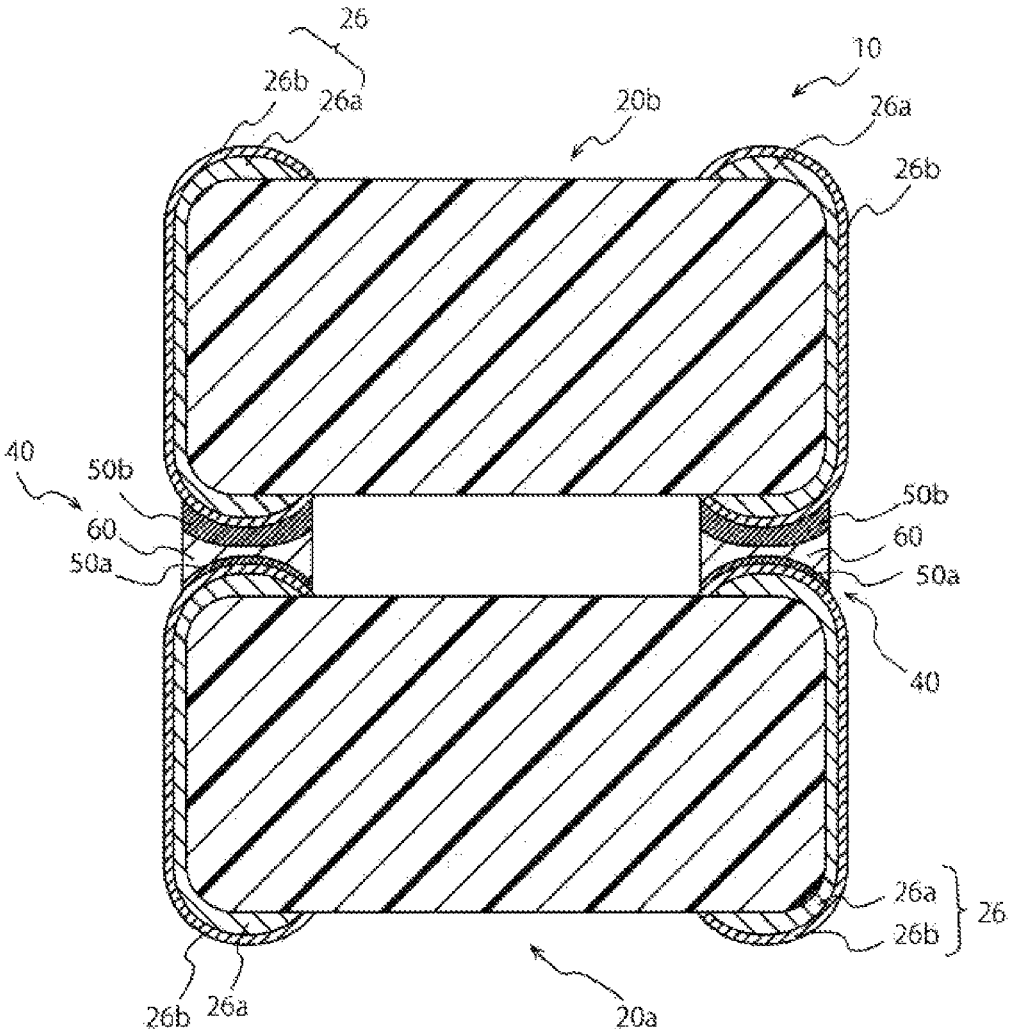
FIG. 1 is a schematic cross-sectional view illustrating an electronic component structure according to a first embodiment of the present disclosure.

FIG. 1 is a schematic cross-sectional view illustrating an electronic component structure 10 according to a first embodiment. As illustrated in FIG. 1, the electronic component structure 10 includes a first electronic component 20a, a second electronic component 20b, and a multilayer connection portion 40 that connects the first electronic component 20a and the second electronic component 20b.

As illustrated in FIG. 1, in the electronic component structure 10, the first electronic component 20a and the second electronic component 20b are integrated with each other via the multilayer connection portion 40, and function as one electronic component. The first electronic component 20a and the second electronic component 20b each function independently as a chip component that can be surface mounted, and the electronic component structure 10 can also be surface mounted on a substrate or the like as an electronic component. However, the first electronic component 20a, the second electronic component 20b, and the electronic component structure 10 are not limited to those of surface-mounted types, and include those capable of being through-hole mounted, for example. The same applies to other embodiments.

As will be described later, the multilayer connection portion 40 also serves as a conductive path for electrically connecting the first electronic component 20a and the second electronic component 20b, and the electronic component structure 10 functions as one electronic component in which the first electronic component 20a and the second electronic component 20b are electrically connected.

The first electronic component 20a and the second electronic component 20b included in the electronic component structure 10 are electronic components having the same shape, structure, and function. However, a plurality of electronic components 20a and 20b included in the electronic component structure 10 are not limited to have the same shape, structure, and function, and may have different shapes, structures, and functions.

Sizes of the first electronic component 20a and the second electronic component 20b are not particularly limited, and examples thereof include JIS and EIA standard sizes having a length of about 0.4 mm to 6.4 mm and a width of about 0.2 mm to 3.2 mm. The same applies to electronic components 20a and 20b used in other embodiments.

As illustrated in FIG. 1, the first electronic component 20a has a substantially rectangular parallelepiped outer shape, and includes an element body 21 and a pair of terminal electrodes 26. The terminal electrode 26 is formed so as to extend over a pair of end surfaces facing each other and a part of side surfaces adjacent to the end surfaces in the element body 21 having a substantially rectangular parallelepiped shape. The pair of terminal electrodes 26 are formed on a surface of the element body 21 so as to be separated from each other, and one of the terminal electrodes 26 is electrically insulated from the other of the terminal electrodes 26.

The first electronic component 20a is a chip capacitor. Although an internal structure of the element body 21 is not illustrated in FIG. 1, dielectric layers and internal electrode layers are alternately stacked inside the element body 21. A stacking direction of the dielectric layers and the internal electrode layers is an up-down direction parallel to a connection direction (arrangement direction) of the first electronic component 20a and the second electronic component 20b, but alternatively, the stacking direction may be perpendicular to the connection direction (arrangement direction) of the electronic components 20a and 20b and an electrode facing direction.

A material of the dielectric layer is not particularly limited, and the dielectric layer is made of a dielectric material such as calcium titanate, strontium titanate, barium titanate, calcium zirconate, strontium zirconate, calcium strontium zirconate, or a mixture thereof. A thickness of each dielectric layer is not particularly limited, and is generally 1 μm to several hundred micrometers. In the present embodiment, the thickness of each dielectric layer is preferably 0.5 μm to 10.0 μm.

The internal electrode layer inside the element body 21 contains a conductor material. The conductor material contained in the internal electrode layer is not particularly limited, and in a case where a constituent material of the dielectric layer has reduction resistance, a relatively inexpensive base metal can be used. The base metal used for the internal electrode layer is preferably Ni or a Ni alloy. The Ni alloy is preferably an alloy of Ni and one or more elements selected from Cu, Sn, Mn, Cr, and Al, and a Ni content in the alloy is preferably 95% by weight or more. Ni or the Ni alloy may contain various trace components such as P in an amount of about 0.1% by weight or less. In addition, the internal electrode layer may be formed using a general-purpose electrode paste. A thickness of the internal electrode layer may be appropriately determined according to an application or the like. In addition, the internal electrode layer may be formed of a conductive material other than a metal.

The internal electrode layers stacked inside the element body 21 include those connected to one of the terminal electrodes 26 (disposed on a right side of the element body 21 in FIG. 1) and those connected to the other of the terminal electrodes 26 (disposed on a left side of the element body 21 in FIG. 1). A potential difference applied between the pair of terminal electrodes 26 is applied to the dielectric layers of the first electronic component 20a through the internal electrode layer.

As illustrated in FIG. 1, the terminal electrode 26 has a two-layered structure including a lower sintered layer 26a and an upper surface layer 26b. Examples of a material of the sintered layer 26a include Cu and a Cu alloy, Ni and a Ni alloy, Ag and an Ag alloy, and a palladium alloy, but other metals may be used. Examples of a material of the surface layer 26b include Sn, Cu, and Ni. The surface layer 26b is formed on the sintered layer 26a by, for example, a wet plating method.

As an example, the terminal electrode 26 illustrated in FIG. 1 includes a sintered layer 26a formed of sintered Cu and a surface layer 26b formed of Sn by wet plating. However, the terminal electrode 26 of the first electronic component 20a is not limited only to that illustrated in FIG. 1, and may have a structure of a single layer or three layers or more, and may be formed by a method other than sintering and wet plating.

Similarly to the first electronic component 20a, the second electronic component 20b also includes an element body 21 and a pair of terminal electrodes 26. Since the second electronic component 20b has the same shape and structure as the first electronic component 20a, the detailed description of the second electronic component 20b is omitted.

As illustrated in FIG. 1, the electronic component structure 10 has a structure in which the first electronic component 20a and the second electronic component 20b are stacked in a height direction with respect to a mounting surface. The terminal electrodes 26 of the first electronic component 20a and the terminal electrodes 26 of the second electronic component 20b are connected to each other by the multilayer connection portions 40 formed at two positions.

For example, the electronic component structure 10 illustrated in FIG. 1 functions as an integrated electronic component in which the first electronic component 20a and the second electronic component 20b are connected in parallel by bringing the first electronic component 20a into contact with a mounting substrate in a posture illustrated in FIG. 1 and then performing reflow bonding.

As illustrated in FIG. 1, the multilayer connection portion 40 connects the terminal electrodes 26 of the first electronic component 20a and the terminal electrodes 26 of the second electronic component 20b. Further, the multilayer connection portion 40 includes low melting point layers 50a and 50b and a high melting point layer 60, and the low melting point layers 50a and 50b and the high melting point layer 60 are stacked inside the multilayer connection portion 40.

That is, the first electronic component 20a and the second electronic component 20b are connected by the multilayer connection portion 40 formed by overlapping the low melting point layers 50a and 50b and the high melting point layer 60. A stacking direction of the low melting point layers 50a and 50b and the high melting point layer 60 in the multilayer connection portion 40 is the up-down direction parallel to the connection direction (arrangement direction) of the first electronic component 20a and the second electronic component 20b.

Figure 2:
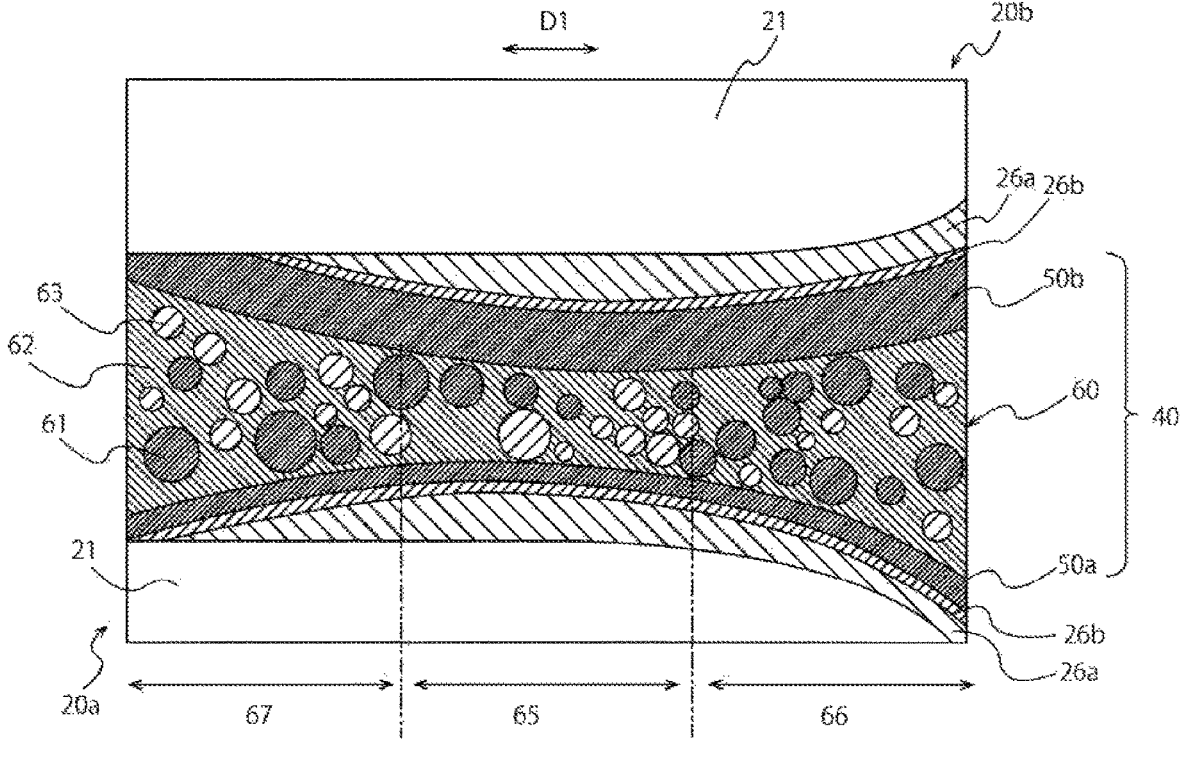
FIG. 2 is a schematic cross-sectional view illustrating peripheral portions of a multilayer connection portion in the electronic component structure illustrated in FIG. 1.

FIG. 2 is a schematic cross-sectional view illustrating the multilayer connection portion 40 and peripheral portions thereof in the electronic component structure 10 illustrated in FIG. 1. As illustrated in FIG. 2, the multilayer connection portion 40 has a stacked structure of three or more layers (three layers in the example illustrated in FIG. 2) with one high melting point layer 60 sandwiched between two low melting point layers 50a and 50b. However, the multilayer connection portion 40 may include at least one low melting point layer 50a, at least one low melting point layer 50b, and at least one high melting point layer 60 (see FIG. 3 and the like), and the multilayer connection portion also includes those having one low melting point layer 50a, one low melting point layer 50b, and one high melting point layer 60, and those having two or more high melting point layers 60.

The low melting point layers 50a and 50b illustrated in FIG. 2 are located between the first electronic component 20a and the second electronic component 20b, and constitute a part of the multilayer connection portion 40 that connects the terminal electrodes 26 of the first electronic component 20a and the terminal electrodes 26 of the second electronic component 20b. The low melting point layer 50a on a lower side of the high melting point layer 60 and the low melting point layer 50b on an upper side of the high melting point layer 60 are different in arrangement, thickness, and shape, but are the same in contained materials, internal structures, and the like.

The low melting point layers 50a and 50b contain a first metal material having a melting point of 300° C. or lower.

Examples of the first metal material include Sn alone or a solid solution containing Sn as a main component, and an alloy containing Bi and Sn. A content ratio of the first metal material in the low melting point layers 50a and 50b can be about 80% to 100% in terms of an area ratio under micro-scope, and as illustrated in FIG. 2, the low melting point layers 50a and 50b may be substantially formed of one phase made of the first metal material.

The low melting point layers 50a and 50b may include gaps (voids) or the like, but the voids are not included in areas of the low melting point layers 50a and 50b when calculating the area ratio. The same applies to handling of voids with respect to content ratios in other layers.

As illustrated in FIG. 2, of the two low melting point layers 50a and 50b, the low melting point layer 50a as one thereof connects the terminal electrode 26 of the first elec-tronic component 20a and the high melting point layer 60, and the low melting point layer 50b as the other one thereof connects the terminal electrode 26 of the second electronic component 20b and the high melting point layer 60. The two low melting point layers 50a and 50b are different in thickness from each other, and the low melting point layer 50b, which is one of the two low melting point layers 50a and 50b, has a thickness larger than that of the low melting point layer 50a, which is the other one thereof and is located below. In a case where the two low melting point layers 50a and 50b are provided as in the multilayer connection portion 40, by making one of the low melting point layers 50a and 50b thicker than the other rather than making the low melting point layers 50a and 50b have the same thickness, it is possible to effectively suppress a progress of embrittle-ment of the high melting point layer 60 due to stress while suppressing a total thickness of the low melting point layers 50a and 50b.

An average thickness of the low melting point layers 50a and 50b is not particularly limited, and may be, for example, 10 μm to 60 μm, and preferably 15 μm to 55 μm. By making the low melting point layers 50a and 50b thicker than a predetermined value, it is possible to effectively suppress the progress of the embrittlement of the high melting point layer 60 due to stress, and by making the low melting point layers 50a and 50b thinner than the predetermined value, it is possible for the multilayer connection portion 40 to appro-priately withstand the heat at the time of reflow.

Similarly to the low melting point layers 50a and 50b, the high melting point layer 60 illustrated in FIG. 2 is located between the first electronic component 20a and the second electronic component 20b, and constitutes a part of the multilayer connection portion 40 that connects the terminal electrodes 26 of the first electronic component 20a and the terminal electrodes 26 of the second electronic component 20b. The high melting point layer 60 is sandwiched between the two low melting point layers 50a and 50b, and is connected to the terminal electrodes 26 of the first electronic component 20a and the second electronic component 20b through the low melting point layers 50a and 50b.

The high melting point layer 60 contains a second metal material having a melting point of 400° C. or more. In FIG. 2, three regions corresponding to phases of three different metal materials contained in the high melting point layer 60 are indicated by different hatchings. A second region 62, which is a phase of the second metal material in the high melting point layer 60, is indicated by right-downward diagonal hatching in the high melting point layer 60 of FIG. 2.

The second metal material contained in the high melting point layer 60 is preferably an intermetallic compound, more preferably an intermetallic compound containing Sn, and still more preferably an intermetallic compound containing Cu and Sn. In addition, the second metal material contained in the high melting point layer 60 is also preferably an intermetallic compound of any one of $Cu_6Sn_5$, $Cu_3Sn$, $Ni_3Sn_4$, $(Cu,Ni)_6Sn_5$, and $Ag_3Sn$. By using an intermetallic compound as the second metal material, the multilayer connection portion 40 has an appropriate high melting point to withstand heat at the time of reflow and an appropriate electrical conductivity. In addition, when the second metal material is an intermetallic compound containing Sn, bond-ability with the low melting point layers 50a and 50b is good, and a problem such as delamination can be more reliably prevented.

As illustrated in FIG. 2, in addition to the second metal material having a melting point of 400° C. or higher, the high melting point layer 60 may contain a first metal material which is Sn alone or a solid solution containing Sn as a main component. A first region 61, which is a layer of the first metal material in the high melting point layer 60, is indicated by right-upward dense diagonal hatching in the high melting point layer 60 of FIG. 2.

In the multilayer connection portion 40 illustrated in FIG. 2, the high melting point layer 60 contains the first metal material at a content ratio smaller than that of the low melting point layers 50a and 50b. With such a high melting point layer 60, heat resistance to withstand the heat at the time of reflow is exhibited, and the problem that the high melting point layer 60 becomes brittle due to stress can be suitably prevented. In addition, with such a high melting point layer 60, bondability with the low melting point layers 50a and 50b is better, and problems such as delamination can be more reliably prevented.

In addition to the second metal material, which is an intermetallic compound and the like, and the first metal material, which is Sn alone or a solid solution containing Sn as a main component, the high melting point layer 60 may contain a third metal material composed of Cu alone or a solid solution containing Cu as a main component. A third region 63, which is a layer of the third metal material in the high melting point layer 60, is indicated by rough right-upward diagonal hatching in the high melting point layer 60 of FIG. 2.

Since the high melting point layer 60 contains the third metal material made of Cu or the like, even in a case where the high melting point layer 60 contains the first metal material having a low melting point, the multilayer connec-tion portion 40 exhibits the heat resistance to withstand the heat at the time of reflow. In addition, since the high melting point layer 60 contains the third metal material made of Cu or the like, it is possible to suitably prevent the problem that the high melting point layer 60 becomes brittle due to stress.

The content ratio of the first metal material (first region 61) and the second metal material (second region 62) in the high melting point layer 60 is not particularly limited, and is preferably a value of 0.4 to 0.8 obtained by dividing the first metal material (area of first region 61) by the second metal material (area of second region 62) in terms of an area ratio under microscope, for example. By setting the content ratio of the first metal material (first region 61) to be a predeter-mined value or more with respect to the second metal material (second region 62), the problem that the high melting point layer 60 becomes brittle due to stress can be suitably prevented, and the problems such as delamination can be more reliably prevented. In addition, by setting the content ratio of the first metal material (first region 61) to be the predetermined value or less with respect to the second metal material (second region 62), the high melting point layer 60 exhibits good heat resistance to withstand the heat at the time of reflow.

The content ratio of the second metal material (second region 62) and the third metal material (third region 63) in the high melting point layer 60 is not particularly limited, and is preferably a value of 0.3 to 1.0 obtained by dividing the third metal material (area of third region 63) by the second metal material (area of second region 62) in terms of an area ratio under microscope, for example. By setting the content ratio of the third metal material (third region 63) to be a predetermined value or more with respect to the second metal material (second region 62), the problem that the high melting point layer 60 becomes brittle due to stress can be suitably prevented, and the heat resistance of the high melting point layer 60 can be improved. In addition, by setting the content ratio of the third metal material (third region 63) to be the predetermined value or less with respect to the second metal material (second region 62), the multilayer connection portion 40 exhibits good connection strength.

As illustrated in FIG. 2, the high melting point layer 60 of the multilayer connection portion 40 includes: a center portion 65 disposed in a center in a first direction D1 orthogonal to a stacking direction (up-down direction) of the multilayer connection portion; and peripheral portions 66 and 67 disposed on both sides of the center portion 65 so as to sandwich the center portion 65 along the first direction D1 and having a thickness larger than that of the center portion 65. In addition, the low melting point layers 50a and 50b in contact with the high melting point layer 60 are continuously in contact with the high melting point layer 60 from one peripheral portion 66 sandwiching the center portion 65 to the other peripheral portion 67 via the center portion 65.

As described above, since the high melting point layer 60 of the multilayer connection portion 40 has a thin center portion 65 and the low melting point layers 50a and 50b are in contact with the center portion 65, even in a case where the low melting point layer starts to melt due to a temperature rise, a first metal is maintained between the high melting point layer 60 and the terminal electrodes 26 by capillary action. Accordingly, in the multilayer connection portion 40 having such a shape feature, connection between the first electronic component 20a and the second electronic component 20b can be maintained against an external force even in a case where a temperature of the low melting point layers 50a and 50b rises to a melting point of the first metal or more due to the heat at the time of reflow.

An average thickness of the high melting point layer 60 is not particularly limited, and may be, for example, 30 μm to 100 μm, and preferably 40 μm to 90 μm. By making the high melting point layer 60 thicker than a predetermined value, the multilayer connection portion 40 can appropriately withstand the heat at the time of reflow, and by making the high melting point layer 60 thinner than the predetermined value, the problem that the connection strength of the multilayer connection portion 40 is reduced as the embrittlement of the high melting point layer 60 progresses due to stress can be effectively suppressed.

It is also preferable to make the average thickness of the high melting point layer 60 thicker than the average thickness of the low melting point layers 50a and 50b from the viewpoint that the multilayer connection portion 40 can appropriately withstand the heat at the time of reflow.

The electronic component structure 10 illustrated in FIG. 1 can be manufactured by preparing the first electronic component 20a and the second electronic component 20b by a predetermined manufacturing method or the like, then forming the high melting point layer 60 and the low melting point layers 50a and 50b between the first electronic component 20a and the second electronic component 20b, and connecting the first electronic component 20a and the second electronic component 20b by the multilayer connection portion 40.

In the multilayer connection portion 40 as illustrated in FIG. 2, for example, a concave lens type high melting point layer 60 having a thin center portion 65 and thick peripheral portions 66 and 67 is formed of the second metal material or the like, and then the low melting point layers 50a and 50b are formed on both sides of the high melting point layer 60. Thereafter, the high melting point layer 60 and the low melting point layers 50a and 50b preformed in a three-layered structure are disposed for the prepared first electronic component 20a and second electronic component 20b, and by remelting and solidifying the low melting point layers 50a and 50b, the first electronic component 20a and the low melting point layer 50a are connected to each other and the second electronic component 20b and the low melting point layer 50b are connected to each other. In this manner, the multilayer connection portion 40 as illustrated in FIG. 2 is formed, and the electronic component structure 10 as illustrated in FIG. 1 can be obtained.

However, a method of manufacturing the electronic component structure 10 is not limited to a method using a joining member in which the high melting point layer 60 and the low melting point layers 50a and 50b are formed in advance (preformed) as described above. For example, the electronic component structure 10 may be manufactured by using a method in which the high melting point layer 60 and the low melting point layers 50a and 50b are formed in a series of heating and cooling processes associated with the connection of the electronic components 20a and 20b using a bonding material in which the high melting point layer 60 and the low melting point layers 50a and 50b are not formed in advance. The same applies to methods of manufacturing an electronic component structure according to other embodiments.

In the electronic component structure 10 described above, a plurality of electronic components 20a and 20b are connected to the multilayer connection portion 40 formed by overlapping the low melting point layers 50a and 50b and the high melting point layer 60. Such a multilayer connection portion 40 can withstand the heat at the time of reflow and suitably maintain the connection of the electronic components 20a and 20b, mainly by a function of the high melting point layer 60 having a high melting point, and can suitably prevent a problem in which a minute crack, peeling, or the like is generated and embrittlement of the multilayer connection portion 40 progresses due to stress, mainly by a function of the low melting point layers 50a and 50b which are flexible and rich in toughness.

Second Embodiment

Figure 3:
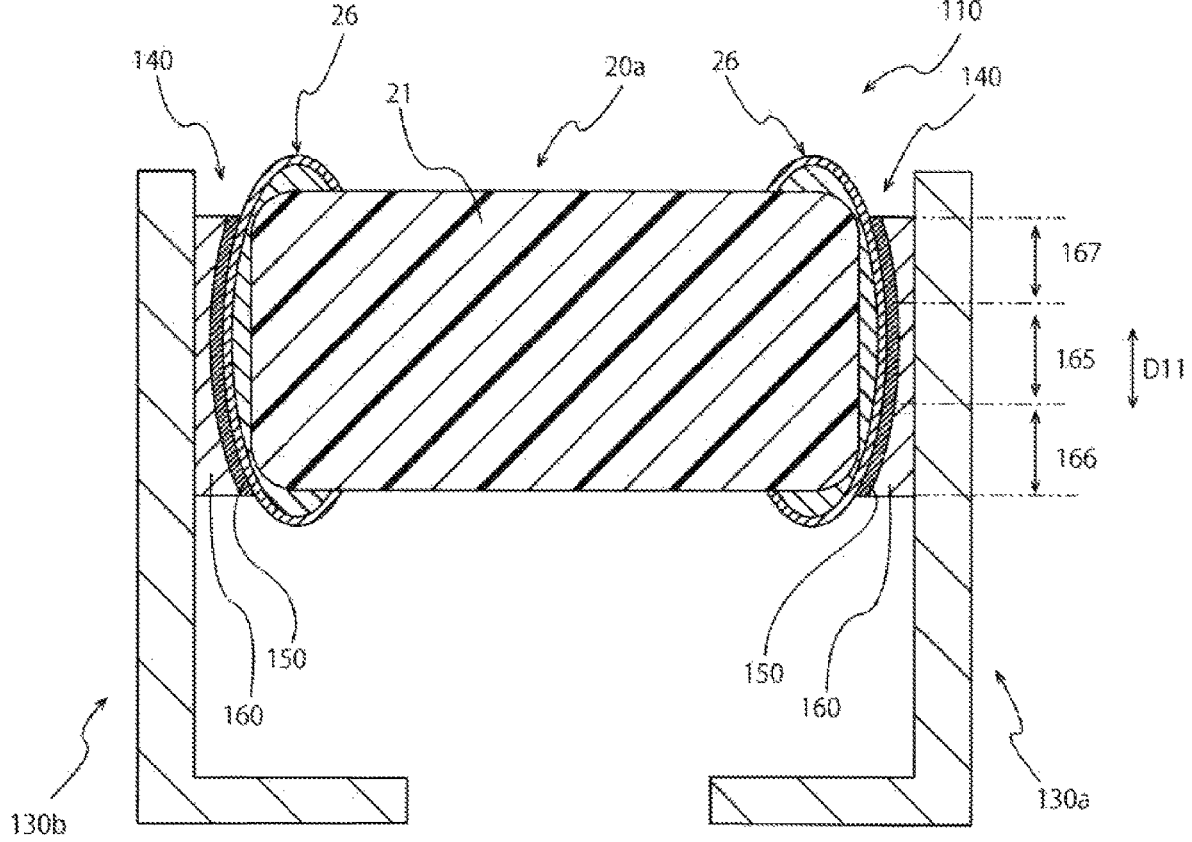
FIG. 3 is a schematic cross-sectional view illustrating an electronic component structure according to a second embodiment of the present disclosure.

FIG. 3 is a schematic cross-sectional view illustrating an electronic component structure 110 according to a second embodiment. As illustrated in FIG. 3, the electronic component structure 110 includes a first electronic component 20a, a pair of metal plates 130a and 130b, and multilayer connection portions 140 that connect the first electronic component 20a and the metal plates 130a and 130b. Regarding the electronic component structure 110, differences thereof from the electronic component structure 10 according to the first embodiment will be mainly described, and descriptions of points common to those of the electronic component structure 10 will be omitted.

As illustrated in FIG. 3, in the electronic component structure 110, the first electronic component 20a and the pair of metal plates 130a and 130b are integrated with each other via the multilayer connection portions 140. The first electronic component 20a is the same as the first electronic component 20a illustrated in FIG. 1. Similarly to the multilayer connection portion 40 illustrated in FIG. 1, the multilayer connection portion 140 also serves as a conductive path that electrically connects the first electronic component 20a and the pair of metal plates 130a and 130b.

The electronic component structure 110 includes two multilayer connection portions 140, one of which connects one terminal electrode 26 of the first electronic component 20a to the metal plate 130a, and the other of which connects the other terminal electrode 26 of the first electronic component 20a to the metal plate 130b. The metal plates 130a and 130b are made of a good conductor metal such as Cu or a Cu alloy. For example, the electronic component structure 110 is mounted by bringing the pair of metal plates 130a and 130b into contact with a mounting substrate in a posture as illustrated in FIG. 3 and then performing reflow bonding.

The multilayer connection portion 140 illustrated in FIG. 3 is formed by overlapping a low melting point layer 150 and a high melting point layer 160. A stacking direction of the low melting point layer 150 and the high melting point layer 160 in the multilayer connection portion 140 is a horizontal direction parallel to a connection direction of the first electronic component 20a and the metal plates 130a and 130b.

The multilayer connection portion 140 has a stacked structure of two layers in which the low melting point layer 150 and the high melting point layer 160 are stacked one by one. The low melting point layer 150 connects the terminal electrode 26 of the first electronic component 20a and the high melting point layer 160. A first metal material contained in the low melting point layer 150, a melting point thereof, a thickness of the low melting point layer 150, and the like are the same as those of the low melting point layers 50a and 50b described in the first embodiment.

The high melting point layer 160 connects the low melting point layer 150 and the metal plates 130a and 130b. A first metal material, a second metal material, and a third metal material contained in the high melting point layer 160 and ratios thereof, a melting point of the second metal material, a thickness of the high melting point layer 160, and an internal structure of the high melting point layer 160 as illustrated in FIG. 2 are the same as those of the high melting point layer 60 described in the first embodiment.

As illustrated in FIG. 3, the high melting point layer 160 of the multilayer connection portion 140 includes: a center portion 165 disposed in a center in a first direction D11 (up-down direction) orthogonal to a stacking direction (horizontal direction) of the multilayer connection portion; and peripheral portions 166 and 167 disposed on both sides of the center portion 165 so as to sandwich the center portion 165 along the first direction D11 and having a thickness larger than that of the center portion 165. In addition, the low melting point layer 150 in contact with the high melting point layer 160 is continuously in contact with the high melting point layer 160 from one peripheral portion 166 sandwiching the center portion 165 to the other peripheral portion 167 via the center portion 165.

As illustrated in FIG. 3, the multilayer connection portion 140 in which the low melting point layer 150 is formed on a curved surface on one side of the high melting point layer 160 also has the same effect as that of the multilayer connection portion 40 in which the low melting point layers 50a and 50b are formed on curved surfaces on both sides of the high melting point layer 60 as illustrated in FIG. 2.

In addition, the electronic component structure 110 according to the second embodiment exhibits the same effect as that of the electronic component structure 10 with respect to characteristics common to the electronic component structure 10.

EXAMPLES

Hereinafter, the electronic component structure according to the present disclosure will be further described in detail with reference to examples. However, conditions and the like described in the examples are merely examples, and a technical scope of the electronic component structure is not limited to the description of the specific examples.

Evaluation 1

Samples 01 to 08, a sample 15, and a sample 16 to be described below were prepared, and a bonding strength test and a drop test (230° C.) described below were performed.

Sample 01

The sample 01 was prepared which is an example of the electronic component structure 10 according to the first embodiment illustrated in FIGS. 1 and 2. Specifically, as the first and second electronic components 20a and 20b, chip capacitors of 4.5 mm×3.2 mm×2.2 mm were prepared, and the two chip capacitors were connected to each other by the multilayer connection portion 40 of three layers in which two low melting point layers 50a and 50b sandwich one high melting point layer 60, thereby preparing the sample 01 as the electronic component structure 10 as illustrated in FIG. 1. The low melting point layers 50a and 50b contained Sn as the first metal material, and were formed of a phase of the first metal material. The high melting point layer 60 contained Sn as the first metal material, $Cu_6Sn_5$, which is an intermetallic compound, as the second metal material, and Cu as the third metal material, and as illustrated in FIG. 2, the first region 61, the second region 62, and the third region 63 were formed in the high melting point layer 60. The first region 61 (Sn)/the second region 62 ($Cu_6Sn_5$) in terms of an area ratio under microscope was 0.71. A maximum thickness of the center portion 65 of the high melting point layer 60 was 63 μm, a maximum thickness of the peripheral portions 66 and 67 was 109 μm, and a difference in thickness between the center portion 65 and the peripheral portions 66 and 67 was 46 μm.

Sample 02

Two chip capacitors were connected to each other by a connection portion of only one layer similar to the high melting point layer 60 in the sample 01 in place of the multilayer connection portion 40 of three layers, thereby preparing the sample 02. Portions other than the connection portion are similar to those of the sample 01.

Sample 03

Two chip capacitors were connected to each other by a connection portion of only one layer similar to the low melting point layer 50a in the sample 01 in place of the multilayer connection portion 40 of three layers, thereby preparing the sample 03. Portions other than the connection portion are similar to those of the sample 01.

Sample 04

The sample 04 was prepared which is an example of the electronic component structure 110 according to the second embodiment illustrated in FIG. 3. Specifically, as the first electronic component 20*a*, a chip capacitor of 4.5 mm×3.2 mm×2.2 mm was prepared, and the two metal plates 130*a* and 130*b* and the chip capacitor were connected to each other by the multilayer connection portion 140 of two layers in which one low melting point layer 150 and one high melting point layer 160 overlap each other, thereby preparing the sample 04 which is the electronic component structure 110 as illustrated in FIG. 3. The low melting point layer 150 contained Sn as the first metal material and was formed of a single phase of Sn. The high melting point layer 160 contained Sn as the first metal material, $Cu_6Sn_5$, which is an intermetallic compound, as the second metal material, and Cu as the third metal material, and similarly to the high melting point layer 60 illustrated in FIG. 2, the first to third regions formed of the first to third metal materials were formed in the high melting point layer 160.

Sample 05

A chip capacitor and the metal plates 130*a* and 130*b* were connected to each other by a connection portion of only one layer similar to the high melting point layer 160 in the sample 04 in place of the multilayer connection portion 140 of two layers, thereby preparing the sample 05. Portions other than the connection portion are similar to those of the sample 04.

Sample 06

Two chip capacitors were connected to each other by a connection portion of only one layer similar to the low melting point layer 50*a* in the sample 04 in place of the multilayer connection portion 140 of two layers, thereby preparing the sample 06. Portions other than the connection portion are similar to those of the sample 01.

Sample 07

Two chip capacitors were connected to each other in the same manner as in the sample 01 except that the high melting point layer 60 in the sample 01 was formed of $Cu_6Sn_5$ which is the second metal material, thereby preparing the sample 07.

Sample 08

Two chip capacitors were connected to each other in the same manner as in the sample 01 except that the high melting point layer 60 in the sample 01 was formed of Sn which is the first metal material and $Cu_6Sn_5$ which is the second metal material, thereby preparing the sample 08.

Sample 15

Two chip capacitors were connected to each other in the same manner as in the sample 01 except that the intermetallic compound as the second metal material contained in the high melting point layer 60 in the sample 01 was changed from $Cu_6Sn_5$ to $Cu_3Sn$, thereby preparing the sample 15.

Sample 16

Two chip capacitors were connected to each other in the same manner as in the sample 01 except that the intermetallic compound as the second metal material contained in the high melting point layer 60 in the sample 01 was changed from $Cu_6Sn_5$ to $(Cu,Ni)_6Sn_5$, thereby preparing the sample 16.

Bonding Strength Test

Each of the prepared samples is surface-mounted on a printed board, and then a thermal shock test at −55° C./125° C. is performed 240 cycles. Surface mounting of the sample was performed by applying a cream solder of Sn—Ag—Cu to a printed board using a 250 μm metal mask. To a mounted sample after the thermal shock, a fixture was continuously applied at a speed of 30 mm/min until a failure occurred, and a force at the time of the failure was measured. Each ten samples of the samples 01 to 08, the sample 15, and the sample 16 were tested (n=10), and an average value thereof was calculated. Results are shown in Table 1. Incidentally, 120 N or more was evaluated as A (very good), 100 N or more was evaluated as B (good), and less than 100 N was evaluated as C (insufficient).

Drop Test (230° C.)

After the sample is held at a predetermined height by using the fixture, a load (weight of 15 g) is applied to one of the electronic components or the metal plate, the load being in a direction in which the sample is detached from the other of the electronic components held by the fixture and drops, and the sample is left in a high temperature environment (230° C.) for 3 minutes. Each ten samples of the samples 01 to 08, the sample 15, and the sample 16 were tested (n=10), and the number of samples in which one of the electronic components or the metal plate dropped by the load after being left was calculated. Results are shown in Table 1. Those in which none of the ten samples dropped were evaluated as A (very good), and those in which one or more samples dropped were evaluated as C (insufficient).

TABLE 1

| | Structure TYPE | Structure of connection portion | Number of layers of connection portion | Bonding strength test at −55/125° C. after 240 cycles [N] | Evaluation | Drop test at 230° C. | Evaluation |
|---|---|---|---|---|---|---|---|
| Sample 01 | A | Sn/$Cu_6Sn_5$, Cu, Sn/Sn | 3 layers | 127 | A | 0/10 | A |
| Sample 02 | A | $Cu_6Sn_5$, Cu, Sn | 1 layer | 88 | C | 0/10 | A |
| Sample 03 | A | Sn | 1 layer | 110 | B | 3/10 | C |
| Sample 04 | B | Sn/$Cu_6Sn_5$, Cu, Sn | 2 layers | 125 | A | 0/10 | A |
| Sample 05 | B | $Cu_6Sn_5$, Cu, Sn | 1 layer | 91 | C | 0/10 | A |
| Sample 06 | B | Sn | 1 layer | 119 | B | 2/10 | C |

TABLE 1-continued

| | Structure TYPE | Structure of connection portion | Number of layers of connection portion | Bonding strength test at - 55/125° C. after 240 cycles [N] | Evaluation | Drop test at 230° C. | Evaluation |
|---|---|---|---|---|---|---|---|
| Sample 07 | A | Sn/Cu$_6$Sn$_5$/Sn | 3 layers | 106 | B | 0/10 | A |
| Sample 08 | A | Sn/Cu$_6$Sn$_5$, Sn/Sn | 3 layers | 122 | A | 0/10 | A |
| Sample 15 | A | Sn/Cu$_3$Sn, Cu, Sn/Sn | 3 layers | 121 | A | 0/10 | A |
| Sample 16 | A | Sn/(Cu,Ni)$_6$Sn$_5$, Cu, Sn/Sn | 3 layers | 122 | A | 0/10 | A |

Overall Evaluation of Evaluation 1

As shown in Table 1, the sample 01, the sample 04, the sample 07, the sample 08, the sample 15, and the sample 16, in which connection is made by the multilayer connection portion in which the low melting point layer and the high melting point layer were stacked, exhibited good results in both the bonding strength test and the drop test (230° C.). It can be evaluated that the multilayer connection portion of the samples was able to withstand the heat assumed at the time of reflow and maintain the connection of the electronic components (drop test), and was able to prevent the problem that a minute crack is generated in the multilayer connection portion due to stress generated in the thermal shock test and that the embrittlement progresses (bonding strength test).

In addition, regarding the sample 01, the sample 04, the sample 08, the sample 15, and the sample 16 in which the high melting point layer contains Sn which is the first metal material in addition to the intermetallic compound which is the second metal material, it can be evaluated that results of the bonding strength test were very good, and the embrittlement of the multilayer connection portion due to the thermal shock can be more suitably prevented.

On the other hand, it was confirmed that in the sample 02 and the sample 05 including a connection portion formed by one layer of only a high melting point layer containing an intermetallic compound, results of the bonding strength test were insufficient, and embrittlement of the connection portion progressed due to stress generated in the thermal shock test. In addition, it was confirmed that in the sample 03 and the sample 06 including a connection portion formed by one layer of only a low melting point layer of the Sn phase, results of the drop test (230° C.) were insufficient, and there was a risk that the connection portion was melted by the heat at the time of surface mounting and the connection was released.

Evaluation 2

The sample 01 described above, and a sample 09 and a sample 10 to be described below were prepared, and the bonding strength test and drop test (230° C.) described above and a drop test (250° C.) to be described below were performed.

Sample 09

The sample 09 is the same as the sample 01 except that the maximum thickness of the center portion 65 of the high melting point layer 60 illustrated in FIG. 2 was 55 μm, the maximum thickness of the peripheral portions 66 and 67 was 72 μm, and the difference in thickness between the center portion 65 and the peripheral portions 66 and 67 was 17 μm.

Sample 10

The sample 10 is the same as the sample 01 except that the maximum thickness of the center portion 65 of the high melting point layer 60 illustrated in FIG. 2 was 67 μm, the maximum thickness of the peripheral portions 66 and 67 was 88 μm, and the difference in thickness between the center portion 65 and the peripheral portions 66 and 67 was 21 μm.

Drop Test (250° C.)

The same evaluation as in the drop test (230° C.) was performed except that the temperature at which the sample was left was 250° C. Results are shown in Table 2. Those in which none of the ten samples dropped were evaluated as A (very good), those in which one or two samples dropped were evaluated as B (good), and those in which three or more samples dropped were evaluated as C (insufficient).

TABLE 2

| | Structure TYPE | Structure of bonding portion | | Maximum thickness of peripheral portion [μm] | Maximum thickness of center portion [μm] | Thickness difference [μm] | Bonding strength test at - 55/125° C. after 240 cycles [N] | Evaluation | Drop test at 230° C. | Evaluation | Drop test at 250° C. | Evaluation |
|---|---|---|---|---|---|---|---|---|---|---|---|---|
| Sample 09 | A | Sn/ Cu$_6$Sn$_5$, Cu, Sn/Sn | 3 layers | 72 | 55 | 17 | 121 | A | 0/10 | A | 1/10 | B |
| Sample 10 | A | Sn/ Cu$_6$Sn$_5$, Cu, Sn/Sn | 3 layers | 88 | 67 | 21 | 122 | A | 0/10 | A | 0/10 | A |
| Sample 01 | A | Sn/ Cu$_6$Sn$_5$, Cu, Sn/Sn | 3 layers | 109 | 63 | 46 | 127 | A | 0/10 | A | 0/10 | A |

Overall Evaluation of Evaluation 2

Regardless of the difference in thickness, any of the sample 01, the sample 09, and the sample 10 exhibited good results in the bonding strength test, the drop test (230° C.), and the drop test (250° C.). In particular, the sample 10 and the sample 01 having a large difference in thickness (18 μm or more) had better results in the drop test (250° C.) than that of the sample 09 having a relatively small difference in thickness. It can be evaluated that the multilayer connection portion of the samples was able to withstand the heat assumed at the time of reflow and maintain the connection of the electronic components (drop test: 230° C.), and was able to prevent the problem that a minute crack is generated in the multilayer connection portion due to stress generated in the thermal shock test and that the embrittlement progresses (bonding strength test). In addition, it can be evaluated that the sample 10 and the sample 01 having a large difference in thickness between the center portion 65 and the peripheral portions 66 and 67 of the high melting point layer

60 were able to withstand the heat generated at the time of surface mounting at a higher temperature and maintain the connection of the electronic components (drop test: 250° C.).

Evaluation 3

The sample 01 described above and samples 11 to 14 to be described below were prepared, and the bonding strength test, the drop test (230° C.), and the drop test (250° C.) were performed.

Sample 12 to Sample 14

In the samples 12 to 14, values of the first region (Sn)/the second region ($Cu_6Sn_5$) calculated in terms of an area ratio under microscope in the high melting point layer were 0.38, 0.42, 0.79, and 0.85, respectively. The samples 12 to 14 are similar to the sample 01 except for the values of the first region 61 (Sn)/the second region 62 ($Cu_6Sn_5$). Results are shown in Table 3.

TABLE 3

| | Structure TYPE | Structure of bonding portion | | First region/ second region | Bonding strength test at - 55/125° C. after 240 cycles [N] | Evaluation | Drop test at 230° C. | Evaluation | Drop test at 250° C. | Evaluation |
|---|---|---|---|---|---|---|---|---|---|---|
| Sample 11 | A | $Sn/Cu_6Sn_5$, Cu, Sn/Sn | 3 layers | 0.38 | 117 | B | 0/10 | A | 0/10 | A |
| Sample 12 | A | $Sn/Cu_6Sn_5$, Cu, Sn/Sn | 3 layers | 0.42 | 123 | A | 0/10 | A | 0/10 | A |
| Sample 01 | A | $Sn/Cu_6Sn_5$, Cu, Sn/Sn | 3 layers | 0.71 | 127 | A | 0/10 | A | 0/10 | A |
| Sample 13 | A | $Sn/Cu_6Sn_5$, Cu, Sn/Sn | 3 layers | 0.79 | 129 | A | 0/10 | A | 0/10 | A |
| Sample 14 | A | $Sn/Cu_6Sn_5$, Cu, Sn/Sn | 3 layers | 0.85 | 122 | A | 0/10 | A | 1/10 | B |

Overall Evaluation of Evaluation 3

Regardless of the values of the first region (Sn)/the second region (Cu$_6$Sn$_5$) in the high melting point layer, any of the sample 01 and the sample 12 to the sample 14 exhibited good results in the bonding strength test, the drop test (230° C.), and the drop test (250° C.). However, the sample 11 having a smallest value of the first region (Sn)/the second region (Cu$_6$Sn$_5$) was slightly inferior in the result of the bonding strength test to the others. From such a result, it can be evaluated that the progress of the embrittlement of the multilayer connection portion can be more effectively prevented when the high melting point layer contains the first region (Sn) at a predetermined ratio (0.39) or more.

In addition, the sample 14 having a largest value of the first region (Sn)/the second region (Cu$_6$Sn$_5$) was slightly inferior in the result of the drop test (250° C.) to the others. From such a result, it can be evaluated that the heat resistance of the multilayer connection portion can be improved by setting the first region (Sn) contained in the high melting point layer to be a predetermined ratio (0.84) or less.

Although characteristics of the electronic component structure according to the present disclosure have been described with reference to the embodiments and the examples, the electronic component structure is not limited only to the embodiments and the examples, and it is needless to say that the electronic component structure includes many other embodiments and modifications. For example, the number of the electronic components included in the electronic component structure is not limited to one or two as described in the embodiments, and a structure in which three or more electronic components are connected by the multilayer connection portion is also included in the electronic component structure of the present disclosure.

The electronic component included in the electronic component structure is not limited to a capacitor, and may be an inductor, a varistor, or a combination thereof.

As understood from the above description, the present description discloses the following.

Appendix 1

An electronic component structure according to the present disclosure includes:
a first electronic component;
a second electronic component;
a low melting point layer that is located between the first electronic component and the second electronic component and contains a first metal material having a melting point of 300° C. or lower; and
a high melting point layer that is located between the first electronic component and the second electronic component and contains a second metal material having a melting point of 400° C. or higher, in which
the first electronic component and the second electronic component are connected to each other by a multilayer connection portion formed by overlapping the low melting point layer and the high melting point layer.

Appendix 2

Another electronic component structure according to the present disclosure includes:
a first electronic component;
a metal plate;

a low melting point layer that is located between the first electronic component and the metal plate and contains a first metal material having a melting point of 300° C. or lower; and
a high melting point layer that is located between the first electronic component and the metal plate and contains a second metal material having a melting point of 400° C. or higher, in which
the first electronic component and the metal plate are connected to each other by a multilayer connection portion formed by overlapping the low melting point layer and the high melting point layer.

Appendix 3

The second metal material may be an intermetallic compound.

Appendix 4

The first metal material may be Sn alone or a solid solution containing Sn as a main component.

Appendix 5

The multilayer connection portion may have a stacked structure of three or more layers with one high melting point layer sandwiched between two low melting point layers.

Appendix 6

One of the two low melting point layers may have a thickness larger than that of the other.

Appendix 7

The high melting point layer includes a center portion disposed in a center in a first direction perpendicular to a stacking direction of the multilayer connection portion, and peripheral portions disposed on both sides of the center portion so as to sandwich the center portion along the first direction and having a thickness larger than that of the center portion, and
the low melting point layers may be continuously in contact with the high melting point layer from one of the peripheral portions sandwiching the center portion to the other of the peripheral portions via the center portion.

Appendix 8

The first metal material is Sn alone or a solid solution containing Sn as a main component, and
the high melting point layer may contain the first metal material at a content ratio smaller than that of the low melting point layer.

Appendix 9

The first metal material is Sn alone or a solid solution containing Sn as a main component, and
the high melting point layer may contain the second metal material which is an intermetallic compound, the first metal material, and a third metal material composed of Cu alone or a solid solution containing Cu as a main component.

Appendix 10

The second metal material may be an intermetallic compound containing Sn.

Appendix 11

The second metal material may be an intermetallic compound containing Cu and Sn.

Appendix 12

A content ratio of the first metal material and the second metal material in the high melting point layer may be a value of 0.4 to 0.8 obtained by dividing the first metal material by the second metal material.

Appendix 13

A content ratio of the second metal material and the third metal material in the high melting point layer may be a value of 0.3 to 1.0 obtained by dividing the third metal material by the second metal material.

Appendix 14

An average thickness of the low melting point layer may be 10 μm to 60 μm.

Appendix 15

An average thickness of the high melting point layer may be 30 μm to 100 μm.

Appendix 16

The intermetallic compound may be any one of $Cu_6Sn_5$, $Cu_3Sn$, $Ni_3Sn_4$, $(Cu,Ni)_6Sn_5$, and $Ag_3Sn$.

REFERENCE SIGNS LIST

10, 110 electronic component structure
20a first electronic component
20b second electronic component
21 element body
26 terminal electrode
26a sintered layer
26b surface layer
40, 140 multilayer connection portion
50a, 50b, 150 low melting point layer
60, 160 high melting point layer
61 first region
62 second region
63 third region
65, 165 center portion
66, 67, 166, 167 peripheral portion
D1, D11 first direction
130a, 130b metal plate

What is claimed is:
1. An electronic component structure, comprising:
a first electronic component;
a second electronic component;
a low melting point layer located between the first electronic component and the second electronic component and containing a first metal material having a melting point of 300° C. or lower; and a high melting point layer located between the first electronic component and the second electronic component and containing a second metal material having a melting point of 400° C. or higher, wherein
the first electronic component and the second electronic component are connected to each other by a multilayer connection portion formed by overlapping the low melting point layer and the high melting point layer,
the high melting point layer comprises a center portion disposed in a center in a first direction perpendicular to a stacking direction of the multilayer connection portion, and peripheral portions disposed on both sides of the center portion so as to sandwich the center portion along the first direction and having a thickness larger than that of the center portion, and
the low melting point layer is continuously in contact with the high melting point layer from one of the peripheral portions sandwiching the center portion to the other of the peripheral portions via the center portion.
2. The electronic component structure according to claim 1, wherein
the second metal material comprises an intermetallic compound.
3. The electronic component structure according to claim 1, wherein
the first metal material comprises Sn alone or a solid solution containing Sn as a main component.
4. The electronic component structure according to claim 1, wherein
the multilayer connection portion includes a stacked structure of three or more layers with one high melting point layer sandwiched between two low melting point layers.
5. The electronic component structure according to claim 1, wherein
the first metal material comprises Sn alone or a solid solution containing Sn as a main component, and
the high melting point layer contains the first metal material at a content ratio smaller than that of the low melting point layer.
6. The electronic component structure according to claim 1, wherein
the first metal material comprises Sn alone or a solid solution containing Sn as a main component, and
the high melting point layer contains the second metal material which is an intermetallic compound, the first metal material, and a third metal material comprising Cu alone or a solid solution containing Cu as a main component.
7. The electronic component structure according to claim 1, wherein
an average thickness of the low melting point layer is 10 μm to 60 μm.
8. The electronic component structure according to claim 1, wherein
an average thickness of the high melting point layer is 30 μm to 100 μm.
9. An electronic component structure, comprising:
a first electronic component;
a metal plate;
a low melting point layer located between the first electronic component and the metal plate and containing a first metal material having a melting point of 300° C. or lower; and a high melting point layer located between the first electronic component and the metal plate and containing a second metal material having a melting point of 400° C. or higher, wherein the first electronic component and the metal plate are connected to each other by a multilayer connection portion formed by overlapping the low melting point layer and the high melting point layer, the high melting point layer comprises a center portion disposed in a center in a first direction perpendicular to a stacking direction of the multilayer connection portion, and peripheral portions disposed on both sides of the center portion so as to sandwich the center portion along the first direction and having a thickness larger than that of the center portion, and the low melting point layer is continuously in contact with the high melting point layer from one of the peripheral portions sandwiching the center portion to the other of the peripheral portions via the center portion.

10. The electronic component structure according to claim 9, wherein the second metal material comprises an intermetallic compound.

11. The electronic component structure according to claim 9, wherein the first metal material is Sn alone or a solid solution containing Sn as a main component.

12. The electronic component structure according to claim 9, wherein the multilayer connection portion includes a stacked structure of three or more layers with one high melting point layer sandwiched between two low melting point layers.

13. The electronic component structure according to claim 9, wherein the first metal material comprises Sn alone or a solid solution containing Sn as a main component, and the high melting point layer contains the first metal material at a content ratio smaller than that of the low melting point layer.

14. The electronic component structure according to claim 9, wherein the first metal material comprises Sn alone or a solid solution containing Sn as a main component, and the high melting point layer contains the second metal material which is an intermetallic compound, the first metal material, and a third metal material comprising Cu alone or a solid solution containing Cu as a main component.

15. The electronic component structure according to claim 9, wherein an average thickness of the low melting point layer is 10 μm to 60 μm.

16. The electronic component structure according to claim 9, wherein an average thickness of the high melting point layer is 30 μm to 100 μm.

\* \* \* \* \*